United States Patent [19]

Rasmussen

[11] Patent Number: 4,767,488
[45] Date of Patent: Aug. 30, 1988

[54] METHOD AND APPARATUS FOR THE MANUFACTURE AND STRETCHING OF A LAMINATE

[76] Inventor: Ole-Bendt Rasmussen, Forchwaldstrasse 23, CH-6318 Walchwil/Zug, Switzerland

[21] Appl. No.: 915,988

[22] Filed: Oct. 6, 1986

[30] Foreign Application Priority Data

Oct. 4, 1985 [DK] Denmark ............................ 4553/85

[51] Int. Cl.⁴ ...................... B29C 69/00; B29C 31/00
[52] U.S. Cl. .................................... 156/344; 156/229; 156/247; 156/290; 156/474; 156/494; 156/584; 156/496; 264/290.2
[58] Field of Search ............... 156/229, 247, 243, 234, 156/494, 523, 584, 344, 290, 292, 459, 474, 496, 553; 264/288.8, 290.2, 289.6

[56] References Cited

U.S. PATENT DOCUMENTS

| | | | |
|---|---|---|---|
| 3,081,212 | 12/1958 | Taylor et al. | 156/229 |
| 3,380,868 | 5/1968 | Moser | 156/229 |
| 3,820,583 | 6/1974 | Sparks et al. | 156/584 |
| 3,962,012 | 6/1976 | Schumacher | 156/494 |
| 4,177,104 | 12/1979 | Parker | 156/584 |
| 4,254,175 | 3/1981 | Kubat et al. | 156/229 |
| 4,398,985 | 8/1983 | Eagon | 156/247 |
| 4,526,641 | 7/1985 | Schriever et al. | 156/344 |

Primary Examiner—John E. Kittle
Assistant Examiner—Donald J. Loney
Attorney, Agent, or Firm—William J. Daniel

[57] ABSTRACT

Method and apparatus for the manufacture and stretching of a laminate comprising forming at least two laminates, which are stretched together in superposed relation, from at least four films so as to form a combination of laminates and subsequently peeling said combination to form separate laminates. A laminate prepared in this manner is advantageous in that one of its surfaces has a high smoothness evidenced by high gloss and a high coefficient of friction which makes the laminate particularly suitable for use in the production of high quality sacks.

2 Claims, 1 Drawing Sheet

U.S. Patent
Aug. 30, 1988
4,767,488
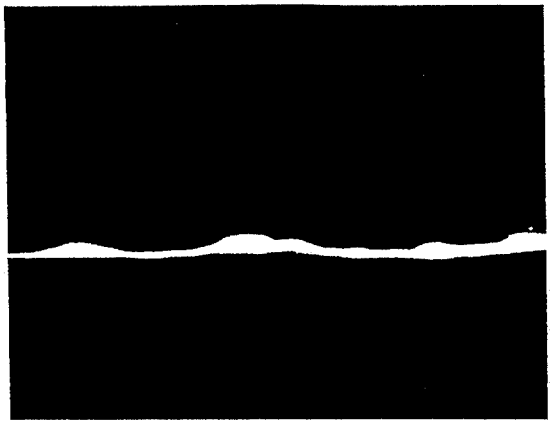

METHOD AND APPARATUS FOR THE MANUFACTURE AND STRETCHING OF A LAMINATE

This invention relates to a method of forming and stretching a laminate comprising at least two films of a polymeric material to a product which can be manufcatured by this method.

The specification of British Pat. No. 1.526.724 describes a method of forming and stretching a laminate comprising at least two films of forming and stretching a laminate comprising at least two films of a polymeric material, said method comprising pressing the films together along lines extending substantially in the longitudinal direction of the films and simultaneously stretching the films in the transverse direction, thereby forming a laminate having a configuration of temporarily substantially evenly distributed substantially longitudinal pleats.

The present invention is an improvement of said method and comprises forming and stretching at least two such laminates together, one on top of the other, from a total of at least four films, to form a combination of the laminates, and subsequently peeling said combination to form separate laminates.

The main advantage of this improved method resides in a surprising increased smoothness of the surfaces of the separate laminates which at least at the beginning of the stretching process are simultaneously pressed and stretched together and remain in intimate contact essentially during the whole stretching operation, and which subsequently are separated from one another. This increased smoothness is evidenced i.a. by an increased gloss, an increased coefficient of friction when a laminate is contacted with the surface of a corresponding laminate by an improved quality of print and by an increased heat-sealability and supersonic sealability, and (on examination in scan-electron microscope) by almost complete lack of a microtopography of this surface. A more detailed explanation of the background for these improved qualities is set forth in the description of the figure at the end of example 1.

The invention presents the additional advantage that the equipment necessary for the production of the laminates in question can be used far more efficient and requires less man power per weight unit of laminate produced than the equipment used in the prior art method.

Preferred means to press the films together along longitudinal lines are—as described in the above mentioned patent—mutually intermeshing grooved rollers, preferably a number of such sets of grooved rollers with "banana rollers" or similar means between which at least in part the longitudinal pleats are stretched out. Preferably, the combined laminates are also stretched longitudinally.

British patent specification No. 1.526.722 describes the manufacture of a laminate by a method comprising extruding at least two layers, each consisting of a composition of polymers which are incompatible to such a degree that the composition on solidification forms a dispersion of particles of one polymer in a polymeric matrix melt, attenuating each layer to obtain a fibrillar grain structure having a predominant direction of splittability after solidification into a film, bonding the two layers to one another with the said predominant directions transverse to one another and biaxially stretching the solidified laminate in substantially uniaxial steps, the stretching being conducted at a temperature sufficiently low to maintain the predominant direction of splittability in each layer.

The present invention is particularly suitable for use in connection with this method.

For practical economical reasons the laminates used in the method according to the present invention preferably is a 2-ply sheet material and each film in the laminate is preferably a coextruded film. It is advantageous to coextrude at least 3 layers in each film: one surface layer (in the following referred to as lamination layer) which provides an adequate bonding between the films in the laminate, another surface layer which provides an easy peeling of the combination into separate laminates, and one or more layers (in the following referred to as main layer(s)) in the middle of each film, in which layers the strength mainly resides. The layer which provides an easy peeling should also be selected with a view to provide the desired surface properties of the laminates, e.g. frictional properties or easy heat sealing. A more detailed description of these features will appear from the examples.

British patent specification No. 1.526.722 describes a high-strength laminate comprising generally weakly adhered biaxially oriented films, each formed of a polymer composition which exhibits a distinct fibrous morphology with the fibres forming a distinct unidirectional grain when measured on a macro-scale but with the fibre portions strongly deflected from this direction as seen on a microscale and with the said unidirectional grain in at least two of the films criss-crossing each other. a product according to the present invention exhibits these features and is further characterized in that one surface has lineary corrugations, while the other surface is essentially plan and essentially without any micro-topography.

The presence or absence of micro-topography can best be established by means of scan-electron microscopy.

The corrugations are of importance for the tear propagation resistance, stiffness on one direction and stacking properties of sacks made from the laminate of the invention, while the plan surface without a microtopography is highly advantageous, especially for the sealability by heat or supersonics, but also for other properties which under circumstances are desirable. Additional advantages are discussed in the description of the drawing and at the end of example 1.

This laminate can be produced by the method described above.

Due to the relatively high amount of material which is introduced between the grooved rollers in the method of the invention, deeper striations (corrugations) may be imparted to the product in its machine direction than it would otherwise be achieved. Up to a certain extent corrugations are advantageous, but they should not be excessive. To solve this problem of the present invention, the oriented material can advantageously be subjected to a heat treatment before or after the peeling process while allowing at least 7% shrinkage in at least its transverse direction. This heat treatment is based on the discovery that the relatively thin zones of the transversely stretched material are overstretched and that the material in these zones exhibit a pronounced tendency to contract when heated to a suitable temperature.

Consequently, variations in the thickness of the material tend to be reduced or almost eliminated during such a heat treatment.

It is preferred to effect a shrinkage of at least 12% in the transverse direction.

The heat treatment may be effected in an oven but in practice it is preferably effected by contacting the material with a heated roller because such a roller has a stabilizing effect on the transverse contraction of the material.

In order to reduce the friction between the material and the heated roller and thus permit a practically full transverse contraction of the material, the heat treatment is advantageously effected by contacting a longitudinally pleated laminate with said heated roller.

The reduction of the width of the material which is effected as a result of the pleating further facilitates the transverse contraction. It should be mentioned that a transverse contraction may take place after it has left the heated roller but the spontaneous tendency to contract is most pronounced at the start of the heat treatment, i.e. while the material is in contact with the heated roller.

For further details regarding this heat treatment, reference is made to may copending Danish patent application No. 1398/82 filed on Mar. 26, 1982.

A particular advantageous main layer for cross-laminates made according to the present invention is also described in the above mentioned copending Danish patent application. Such layer is composed of high molecular weight high density polyethylene and low density polyethylene having a significantly lower molecular weight, said low density polyethylene being selected from the group of copolymers and/or branched polyethylene which (a) exhibit substantially the same or higher elongation at break than the said high molecular weight high density polyethylene when tested at room temperature under slow stretching, (b) are capable of distinctly segregating weight high density polyethylene on cooling of a molten homogenous blend of the said components.

The term "high molecular weight high density polyethylene" (HMHDPE) comprises HDPE having a melt flow index of about or lower than 0.2 according to ASTM D 1238, condition E.

As regards the low density polyethylene, it may advantageously be linear low density polyethylene (LLDPE).

The blending ratio of HMHDPE to LDPE (preferably LLDPE) may conveniently be in the range of from about 15:85 to about 75:25.

Further improvements may be obtained when the blend further contains polypropylene of a molecular weight significantly lower than that of said high molecular weight high density polyethylene.

The ratio of polypropylene to the HMHDPE+LDPE in the blaned may conveniently be in the range of between 0 and 70/30.

The blend may further contain minor amounts of an alloying agent, e.g. a copolymer of propylene and a polyolefin containing 4 or more carbon atoms, or propylene-ethylene rubber.

In connection with a main layer in which the matrix-forming component of the blend is polyethylene (for explanation of fibrils and matrix of the blends, see the abovementioned copending Danish application), the layers having sealing functions (including the two layers which temporarily bind the layers together during the stretching process) advantageously mainly consists of branched polyethylene and exhibit an elongation at break similar to or higher than that of fibril-forming polypropylene or high density polyethylene.

The branched polyethylene for the layers which impart durable lamination preferably is LLDPE, to which there should usually be added up to about 50% of an elastomer, such as ethylene-propylene rubber.

The invention further relates to an apparatus for forming and stretching a laminate comprising at least two films of a polymeric material, said apparatus comprising means for pressing the films together along lines extending substantially in the longitudinally direction of the films and simultaneously stretching the films in the transverse direction, thereby forming a laminate having a configuration of temporarily substantially evenly distributed substantially longitudinal pleats, said apparatus comprising means for forming and stretching at least two such laminates together, one on top of the other, from a total of at least four films, to form a combination of the laminates, and means for subsequently peeling said combination to form separate laminates.

The invention will now be described in more detail with reference to the drawing, which shows a microphoto of a cross-section of a typical product according to the invention, namely the product of example 1. The average thickness is about 75 micron. The photo shows the corrugations on one surface, while the other surface is substantially flat. What cannot be seen here but will appear from scan-electron-microscopical examinations is the practical absence of a "micro-topography" on this surface (i.e. microscopical "hills" and/or cavities on the surface). Such eveness is ideal for sealing purposes, especially when the film is used for sealable bags (or similar packaging materials) and the even surface forms the interior of the bag. The eveness than secures a good sealing contact also under a relatively low pressure and/or temperature. The flatness and eveness further facilitates removal of dust, e.g. by use of an air brush.

The corrugations run in the machine direction of the laminate. They are of importance for high tear-propagation resistance, for manufacture of sacks and easy handling of sacks. Furthermore, when the corrugated surface forms the exterior of a sack, the corrugations have proved useful to reduce the risk of slippage between sacks in a stack, probably because dust collects in the furrows instead of acting as lubricant.

EXAMPLE 1

The example relates to the manufacture of a high-strength cross-laminate and illustrates the use of a coextruded film which contains (1) one surface layer which acts as release layer in the manufacturing process, and which at the same time improves the heat-sealing properties (in the following referred to as release/seal layer) and (2) another surface layer which promotes the bonding (blocking) of the plies of the laminate to each other.

A tubular film is extruded comprising a main layer in the middle, in which layer the strength essentially resides, a release/seal layer and a lamination layer.

The three layers form 75%, 15% and 10%, respectively, of the total film. The gauge of the extruded film is 70 g/m$^2$.

The main layer consists of a blend (intimately pre-blended in a planetary screw extruder) of 50% high molecular weight high density polyethylene (HMHDPE) of the trade name "Hostalen 9255", and 50% lineary low density polyethylene (LLDPE) of melt flow index 1.0 of trade name "Dowlex 2045".

The release/seal layer consists of 100% of the same LLDPE.

The lamination layer consists of 70% of the same LLDPE+30% EPDM of trade name "Nordel 1500".

The extrusion temperature is 240° C. and the blow ratio 1:1. Each of the tubular films is cut helically under an angle of 45° and four such films, each having a width of about 100 cm, are laminated and stretched with the surface layers facing one another in the following sequence:

(1) Lamination layer to lamination layer,
(2) release/seal layer to release/seal layer,
(3) lamination layer to lamination layer.

Initially, the lamination and simultaneous transverse stretching are effected by continuously passing the films five times through the nip between a set of grooved rollers of the type shown in British patent specification No. 1.526.722, FIG. 7. The division on each roller is 1.8 mm, the width of each tip is 0.4 mm and the tip is circularly rounded. The intermeshing between the tips is adjusted to produce the final stretch ratio 1.4:1. The stretching is carried out at 35° C. between each transverse stretching station, the pleats are essentially eliminated by means of "banana rollers", but after the last station the pleats are maintained.

Subseqeuntly and still in the continuous process the laminate is stretched longitudinally at the same temperature by means of rollers to give the same longitudinal stretch ratio 1.4:1.

After the longitudinal stretching, the laminate is introduced in practically tensionless state (tension regulated by means of dancing rollers) into a "free-shrink heat treatment unit" in which they are first transversely stretched at 35° C. between a set of grooved rollers as described above, and then immediately, still in a regularly pleated configuration transferred to an 80° C. hot steel roller. From the hot roller the laminate is transferred still in an almost tensionless state to a water-cooled roller. Finally, it passes through a set of nip rollers and is peeled into two half parts, each of which are strongly laminated (blocked). Prior to this peeling, all 4 films were bonded together almost at every spot of the interphases. The peeling is effected under a low draw tension by means of two sets of nip rollers. Finally, the two 2-ply laminates are wound up on bobbins.

The gauge of the final 2-ply cross-laminate is about 70 g/m².

In order to investigate how safely the 4-ply laminate will delaminate into two half-parts also in case of production irregularities, holes of different irregular shape are cut in the film between the last transverse stretching station and the longitudinal stretching unit. However, even though the material around the holes are irregularly deformed by the stretching, the 4-ply laminate is still cleanly separated into two half-parts by the peeling process.

The surfaces of the final 2-ply laminates which were in intimate contact during the stretching operation and which subsequently were separated from one another are in the following called A surfaces, whereas the remaining surfaces of the final laminates are called B surfaces.

A visual examination of these surfaces shows that the A surfaces are much more glossy when light beams are directed against said surfaces and that the static coefficient of friction between two a surfaces which are in mutual contact is about 2.5 times as high as the static coefficient of friction between two B surfaces. (See table below).

This is indicative for surfaces eveness which in turn determines sealing properties.

Optical microscopic examinations of a cross-section of the final 2-ply laminate are shown in the drawing.

Examinations of the laminates of the invention under an electronic scanning microscope show as mentioned in connection with the description of the drawing that the A surfaces have significantly fewer microscopic irregularities than the B surfaces. It is believed that this is due to the fact that the material located adjacent to microscopic surface cavities tends to be overstretched because of the notch effect of said cavities, whereas microscopically small projections tend to be under-stretched or non-stretched. These differences are significantly reduced when the surface of one film is in so intimate contact with the surface of another film during stretching as achieved by stretching between grooved rollers.

Coefficients of static friction:

|  | A to A | B to B |
| --- | --- | --- |
| Machine direction | 1.2 | 0.42 |
| Transverse direction | 1.2 | 0.40 |

Static peel strength in optimized heat-seals, seam in transverse direction:

A to A: 5.5 kg/inch
B to B: 4.8 kg/inch.

It should be observed that the A and B surfaces consist of identically the same LLDPE type.

EXAMPLE 2

This example illustrates a similar arrangement of release/seal layers and lamination as that of example 1, however with modified components to achieve a high-strength cross-laminate which i.a. is particularly suitable for supersonic welding.

The main layer consists of: 50% homo-polypropylene of a melt flow index of 0.4 according to ASTM D 1238 condition L (trade name: "Holstalen 1050"), 20% HMHDPE of a density of about 0.95 and a melt flow index of about 0.05 according to ASTM D 1238 condition E (trade name: "Hostalen 9255"), 20% LLDPE of a density of 0,920 and a melt flow index of 1.0 according to ASTM D 1238 consition E (trade name: "Dowled 2045"), 10% EPDM containing about 20% ethylene and of a melt flow index of about 0.3 according to ASTM D 11238 condition E.

In all other respects the composition and procedure is the same as in example 1. The gauge of the final cross-laminate is about 70 g/m².

EXAMPLE 3

In the above two examples the release layer was plain LLDPE which combined the release effect with easier sealing of the final product. In this example the laminate is mainly in polypropylene basis, and with the strong bonding between the main layer and the release/seal layer. For this purpose the release/seal layer consists of an ethylene-propylene copolymer of socalled block type, containing about 20% ethylene and having a melt flow index of 0.4 (trade name: "Hostalen 1022").

In all other respects the composition and procedure are as in example 2.

The gauge of the final product is about 70 g/m². It is not sealable by supersonic welding and not heat-sealable at temperatures below the practical melting point of the main layers. However, high heat-seal strength can be achieved of the molten material in the heat seal is allowed to contract in the direction perpendicular to the seam.

EXAMPLE 4

This example illustrates the use of the invention for simultaneous stretching of 4 cross-laminates, one on top of the other, adapted to produce a final gauge of about 20 g/m² in a low-cost stretching process.

The composition is the same as in example 2, except that both surface layers consist of plain LLDPE (the same type as in example (2), the tubular film is extruded in gauge 20 g/m². After the spiral cutting under 30° angle, four such films, from four bobbins are brought together so that each adjacent pair of films criss-cross each other.

The stretching and heat-treatment is exactly as in example 1. The separation of the four 2-ply laminates from each other is started as a manual picking-out of the four correct combination of layers and then continued on a machine.

The reason why plain LLDPE has been used also as lamination layer is that in the case of so thin cross-laminates a higher bonding strength has a disadvantageous effect on the tear propagation resistance.

EXAMPLE 5

In example 3 the surface layers of the final 2-ply crosslaminate were made from an ethylene-paoaylene copolymer containing 20% ethylene.

In order to achieve still better frictional properties it may be necessary to add components which give the layer a high tendency to block to a similar layer so that the "release effect" is lost. This example shows how the invention can be modified for this purpose.

a tubular film (a) having a composition similar to the tubular film described in example 3, except that there is added 30% of the EPDM to the ethylene-propylene copolymer and having a gauge of 70 g/m² is prepared by extrusion.

Another tubular film (b) is extruded from a 4-component coextrusion die. It has the same composition as (a) except that there is coextruded a release layer, in this case Nylon 6, on top of the polypropylene+EPDM layer. The gauge of (b) is 77 g/m², of which about 10% is the nylon layer. It should be noted that the latter bonds very weakly to the adjacent layer of polypropylene+EPDM.

The procedure is continued exactly as in example 3 with the spiral cut films (a) and (b) being laminated in the succession (a) (a) (b) (a) and the nylon layer in (b) being located as the middle layer of the entire laminate (which comprises a total of 13 layers, so the nylon layer is layer No. 7).

At the end of the procedure, all carried out according to example 3, the nylon layer is stripped off and collected. It should be noted that the nylon used as auxiliary material in the process only constitutes 10:4=2.5% of the manufactured cross-laminate, and that the majority thereof can be recycled.

I claim:

1. A method of forming and stretching a laminate comprising at least two films of a polymeric material, said method comprising pressing the films together, along lines extending substantially in the longitudinal direction of the films and simultaneously stretching the films in the transverse direction, thereby forming a laminate having a configuration of temporarily substantially even distributed substantially longitudinal pleats, characterized in forming and stretching at least two such laminates together, one on top of the other, from a total of at least four films, to form a composite of the laminates, and subsequently peeling apart the individual laminates of said composite to form separate laminates.

2. An apparatus for forming and stretching a laminate comprising at least two films of a polymeric material, said apparatus comprising means for pressing the films together along lines extending substantially in the longitudinal direction of the films and simultaneously stretching the films in the transverse direction, thereby forming a laminate having a configuration of temporarily substantially evenly distributed substantially longitudinal pleats, characterized in that said means are adapted to form and stretch at least two such laminates together, one on top of the other, from a total of at least four films, to form a composite of the laminates, and means for subsequently peeling apart the individual laminates of said composite to form separate laminates.

* * * * *